(12) United States Patent
Kamei

(10) Patent No.: US 12,155,935 B2
(45) Date of Patent: Nov. 26, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Chiaki Kamei, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 80 days.

(21) Appl. No.: 18/045,734

(22) Filed: Oct. 11, 2022

(65) Prior Publication Data

US 2023/0118055 A1 Apr. 20, 2023

(30) Foreign Application Priority Data

Oct. 14, 2021 (JP) .................. 2021-169109

(51) Int. Cl.
*H04N 23/695* (2023.01)
*H04N 23/62* (2023.01)
*H04N 23/63* (2023.01)

(52) U.S. Cl.
CPC .......... *H04N 23/695* (2023.01); *H04N 23/62* (2023.01); *H04N 23/633* (2023.01); *H04N 23/635* (2023.01)

(58) Field of Classification Search
CPC ...... H04N 23/695; H04N 23/69; H04N 23/62; H04N 23/661; H04N 23/698
See application file for complete search history.

(56) References Cited

U.S. PATENT DOCUMENTS

| 10,542,210 | B2 | 1/2020 | Kimura | |
|---|---|---|---|---|
| 10,638,034 | B2 | 4/2020 | Hayashi | |
| 2016/0277679 | A1* | 9/2016 | Kimura | .............. H04N 23/695 |
| 2017/0180635 | A1 | 6/2017 | Hayashi | |
| 2019/0349532 | A1 | 11/2019 | Niga | |

FOREIGN PATENT DOCUMENTS

| JP | 2007282069 A | 10/2007 |
|---|---|---|
| JP | 2016178534 A | 10/2016 |
| WO | 2016038970 A1 | 3/2016 |

OTHER PUBLICATIONS

European Patent Office, European Search Report for Application No. 22200901.1, Feb. 2023.

* cited by examiner

*Primary Examiner* — Yogesh K Aggarwal
(74) *Attorney, Agent, or Firm* — Canon U.S.A., Inc. IP Division

(57) ABSTRACT

Information about a movement time to control an image capturing range of an image capturing apparatus from a current image capturing range is acquired based on a user operation, and a display unit is caused to display a first window including information indicating a movable range in which the image capturing range is reachable in the movement time and which is calculated based on the movement time and a movable speed to be variable in a case where the image capturing range of the image capturing apparatus is to be changed.

12 Claims, 9 Drawing Sheets

INFORMATION PROCESSING APPARATUS, INFORMATION PROCESSING METHOD, AND STORAGE MEDIUM

BACKGROUND OF THE INVENTION

Field of the Invention

The present invention relates to an information processing method.

Description of the Related Art

A technique for controlling at least one of pan and tilt of an image capturing apparatus for capturing images to thereby change an image capturing range of the image capturing apparatus has heretofore been known.

A shot function is known as a function for controlling an image capturing apparatus. The shot function is a function for designating a movement time to reach a target image capturing range set as a destination image capturing range, and controlling the image capturing range of the image capturing apparatus from the current image capturing range to the designated target image capturing range to thereby cause the image capturing apparatus to reach the target image capturing range in the designated movement time. Some types of image capturing apparatuses are configured to hold a plurality of target image capturing ranges.

Japanese Patent Application Laid-Open Publication No. 2007-282069 discusses a method for controlling pan and tilt of an image capturing apparatus to reach a target position from a current position in a designated time designated by a user.

However, according to the method discussed in Japanese Patent Application Laid-Open Publication No. 2007-282069, the user cannot recognize an image capturing range that can be actually reached by pan and tilt operations in the designated movement time. This may make it difficult for the user to control the image capturing range to reach the target image capturing range designated by the user in the movement time designated by the user.

Accordingly, the present invention is directed to providing a technique for enabling a user to recognize an image capturing range that can be actually reached in a designated movement time.

SUMMARY OF THE INVENTION

According to an aspect of the present invention, an information processing apparatus includes the following configuration to enable a user to recognize an image capturing range that can be actually reached in a designated movement time. That is, an information processing apparatus causing a display unit to display information about an image capturing apparatus configured to control at least one of pan and tilt to change an image capturing range, the information processing apparatus comprising a computer executing instructions which, when executed by the computer, cause the information processing apparatus to acquire information about a movement time to control the image capturing range from a current image capturing range of the image capturing apparatus based on a user operation, and cause the display unit to display a first window including information indicating a movable range where the image capturing range is reachable in the movement time, the movable range being calculated based on the movement time and a movable speed to be variable in a case where the image capturing range of the image capturing apparatus is to be changed.

Further features of the present invention will become apparent from the following description of exemplary embodiments with reference to the attached drawings.

DESCRIPTION OF THE EMBODIMENTS

Figure 1:
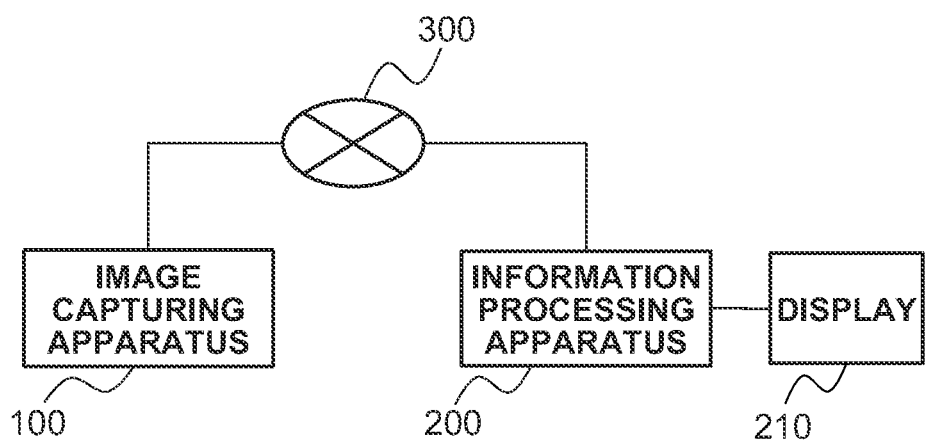
FIG. 1 is a block diagram illustrating a configuration example of a system according to a first exemplary embodiment.

Exemplary embodiments of the present invention will be described below with reference to the accompanying drawings. Components described in the following exemplary embodiments are merely examples and are not limited to the components illustrated in the drawings.

FIG. 1 is a block diagram illustrating a configuration example of a system according to a first exemplary embodiment. The system according to the present exemplary embodiment includes an image capturing apparatus 100, an information processing apparatus 200, a display 210, and a network 300.

The image capturing apparatus 100 and the information processing apparatus 200 are interconnected via the network 300. The network 300 is implemented by a plurality of routers, switches, cables, and the like compliant with communication standards such as ETHERNET®.

The network 300 may be implemented by the Internet, a wired local area network (LAN), a wireless LAN, a wide area network (WAN), or the like.

The image capturing apparatus 100 is an apparatus that captures images and functions as an image capturing unit configured to control at least one of pan, tilt, and zoom to change an image capturing range. The image capturing apparatus 100 transmits image data on captured images, information about an image capturing date and time when images are captured, identification information to identify the image capturing apparatus 100, and information about the image capturing range of the image capturing apparatus 100 to an external apparatus, such as the information processing apparatus 200, via the network 300. The information processing apparatus 200 is a client apparatus such as a personal computer on which programs for implementing functions for processing to be described below are installed.

The system according to the present exemplary embodiment includes a single image capturing apparatus 100, but instead may include a plurality of image capturing apparatuses 100. In other words, the plurality of image capturing apparatuses 100 may be connected to the information processing apparatus 200 via the network 300. In this case, the information processing apparatus 200 determines which one of the plurality of image capturing apparatuses 100 has captured a transmitted image based on, for example, identification information associated with the transmitted image.

The display 210 is composed of a liquid crystal display (LCD) or the like and displays images and the like captured by the image capturing apparatus 100. The display 210 is connected to the information processing apparatus 200 via a display cable that complies with communication standards such as a high definition multimedia interface (HDMI®). The display 210 and the information processing apparatus 200 may be provided in a single housing.

Figure 2:
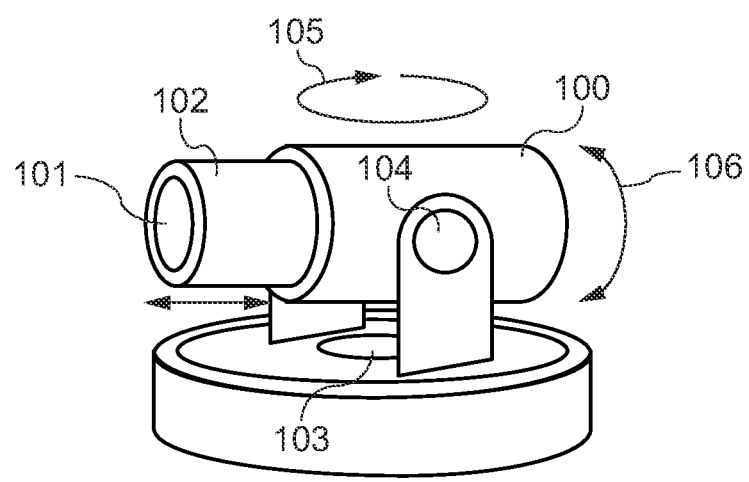
FIG. 2 illustrates an example of an external view of an image capturing apparatus according to the first exemplary embodiment.
Figure 3:
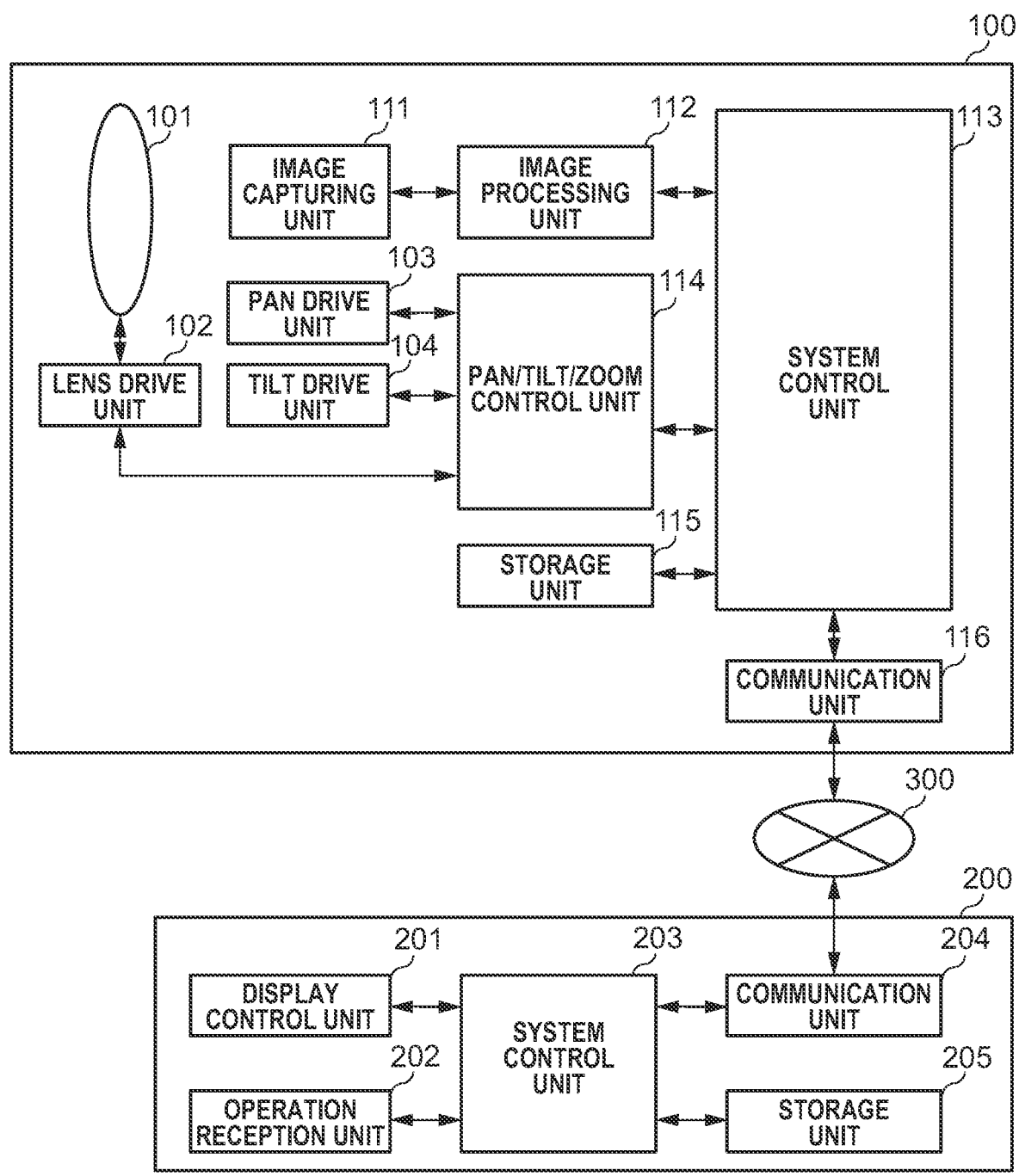
FIG. 3 is a block diagram illustrating examples of functional blocks of the image capturing apparatus and an information processing apparatus according to the first exemplary embodiment.

Referring next to FIGS. 2 and 3, the image capturing apparatus 100 according to the present exemplary embodiment will be described. FIG. 2 illustrates an example of an external view of the image capturing apparatus 100 according to the present exemplary embodiment. FIG. 3 is a block diagram illustrating examples of functional blocks of the image capturing apparatus 100 and the information processing apparatus 200 according to the present exemplary embodiment. Among the functional blocks of the image capturing apparatus 100 illustrated in FIG. 3, functions of an image processing unit 112, a system control unit 113, a pan/tilt/zoom control unit 114, a storage unit 115, a communication unit 116, and the like are implemented as follows. That is, the functions are implemented such that a central processing unit (CPU) 900 of the image capturing apparatus 100 executes computer programs stored in a read-only memory (ROM) 920 of the image capturing apparatus 100 to be described below with reference to FIG. 9.

The direction of an optical axis of a lens 101 corresponds to an image capturing direction of the image capturing apparatus 100. A light beam that has passed through the lens 101 is focused on an image sensor of an image capturing unit 111 of the image capturing apparatus 100. A lens drive unit 102 is composed of a driving system for driving the lens 101 and is configured to change a focal length of the lens 101. The lens drive unit 102 is controlled by the pan/tilt/zoom control unit 114.

A pan drive unit 103 includes a mechanical driving system to perform a pan operation and a motor as a driving source. The pan drive unit 103 is driven to perform control for rotational driving to change the image capturing direction of the image capturing apparatus 100 in a pan direction 105. The pan drive unit 103 is controlled by the pan/tilt/zoom control unit 114.

A tilt drive unit 104 includes a mechanical driving system to perform a tilt operation and a motor as a driving source. The tilt drive unit 104 is driven to perform control for rotational driving to change the image capturing direction of the image capturing apparatus 100 in a tilt direction 106. The tilt drive unit 104 is controlled by the pan/tilt/zoom control unit 114.

The image capturing unit 111 includes an image sensor (not illustrated) such as a charge-coupled device (CCD) sensor or a complementary metal-oxide-semiconductor (CMOS) sensor. The image capturing unit 111 photoelectrically converts an object image formed through the lens 101, thereby generating an electric signal. The image processing unit 112 performs image processing such as processing of converting the electric signal obtained through the photoelectric conversion by the image capturing unit 111 into a digital signal, and compression coding processing, thereby generating image data as data on captured images.

Based on an instruction transmitted from the system control unit 113, the pan/tilt/zoom control unit 114 controls the pan drive unit 103, the tilt drive unit 104, and the lens drive unit 102, thereby controlling the pan, tilt, and zoom of the image capturing apparatus 100. The storage unit 115 stores (holds), for example, information indicating the image capturing range. The storage unit 115 stores also information about a target image capturing range in a shot function.

The communication unit 116 communicates with the information processing apparatus 200 via an interface (I/F) 940 to be described below with reference to FIG. 9. For example, the communication unit 116 transmits image data on images captured by the image capturing apparatus 100 to the information processing apparatus 200 via the network 300. The communication unit 116 also transmits information indicating the current image capturing range of the image capturing apparatus 100. The communication unit 116 receives control commands that are transmitted from the information processing apparatus 200 and are used to control the image capturing apparatus 100, and transmits the control commands to the system control unit 113.

The system control unit 113 controls the overall operation of the image capturing apparatus 100 based on processing executed by the CPU 900 to be described below with reference to FIG. 9, and performs, for example, the following processing. That is, the system control unit 113 analyzes the control commands that are transmitted from the information processing apparatus 200 and are used to control the image capturing apparatus 100, and performs processing based on the control commands. The system control unit 113 issues pan/tilt/zoom operation instructions to the pan/tilt/zoom control unit 114. In the case of transmitting image data generated by the image processing unit 112 to the information processing apparatus 200, the system control unit 113 adds information about an image capturing time when the image data is captured and information about the image capturing range to the image data.

Assume that the image capturing range according to the present exemplary embodiment is determined based on a pan value, a tilt value, and a zoom value of the image capturing apparatus 100. The pan value is the angle of the image capturing direction (optical axis) in the pan direction 105 of the image capturing apparatus 100 from 0 [degrees], for example, when one of driving ends of the pan drive unit 103 is set as 0 [degrees]. The tilt value is the angle of the image capturing direction (optical axis) in the tilt direction 106 of the image capturing apparatus 100 from 0 [degrees], for example, when one of driving ends of the tilt drive unit 104 is set as 0 [degrees]. The zoom value of the image capturing apparatus 100 when an image is captured by the image capturing apparatus 100 is calculated based on the focal length of the lens 101.

Next, information processing to be executed by the information processing apparatus 200 according to the present exemplary embodiment will be described with reference to the functional blocks of the information processing apparatus 200 illustrated in FIG. 3. Each function of the information processing apparatus 200 is implemented as follows using the ROM 920 and the CPU 900 to be described below with reference to FIG. 9. That is, the functions illustrated in FIG. 3 are implemented such that the CPU 900 of the information processing apparatus 200 executes computer programs stored in the ROM 920 of the information processing apparatus 200.

A display control unit 201 causes the display 210 to display a graphical user interface (GUI) to make settings for images captured by the image capturing apparatus 100 and the shot function. An operation reception unit 202 receives information about an operation performed by a user through an input device (not illustrated) such as a keyboard, a mouse, or a touch panel. Assume that a button, a mouse, a joystick, or the like is used as an input unit to receive various operations from the user. In this case, for example, the display control unit 201 causes the display 210 to display a GUI for making settings for the shot function, and the operation reception unit 202 receives information about a user operation on the GUI displayed on the display 210. A system control unit 203 transmits control commands to a remote camera via a communication unit 204 based on a user operation.

The communication unit 204 transmits various setting commands transmitted from the system control unit 203 and control commands for the image capturing apparatus 100 to the image capturing apparatus 100 via the I/F 940 to be described below with reference to FIG. 9. The communication unit 204 receives image data transmitted from the image capturing apparatus 100 and responses from the image capturing apparatus 100 in response to the commands transmitted from the information processing apparatus 200 to the image capturing apparatus 100, and transmits the image data and responses to the system control unit 203. A storage unit 205 stores information about the shot function, image data on images acquired by the communication unit 204, and the like.

The system control unit 203 generates various setting commands and control commands based on a user operation received by the operation reception unit 202, and transmits the generated commands to the image capturing apparatus 100 via the communication unit 204.

Figure 4:
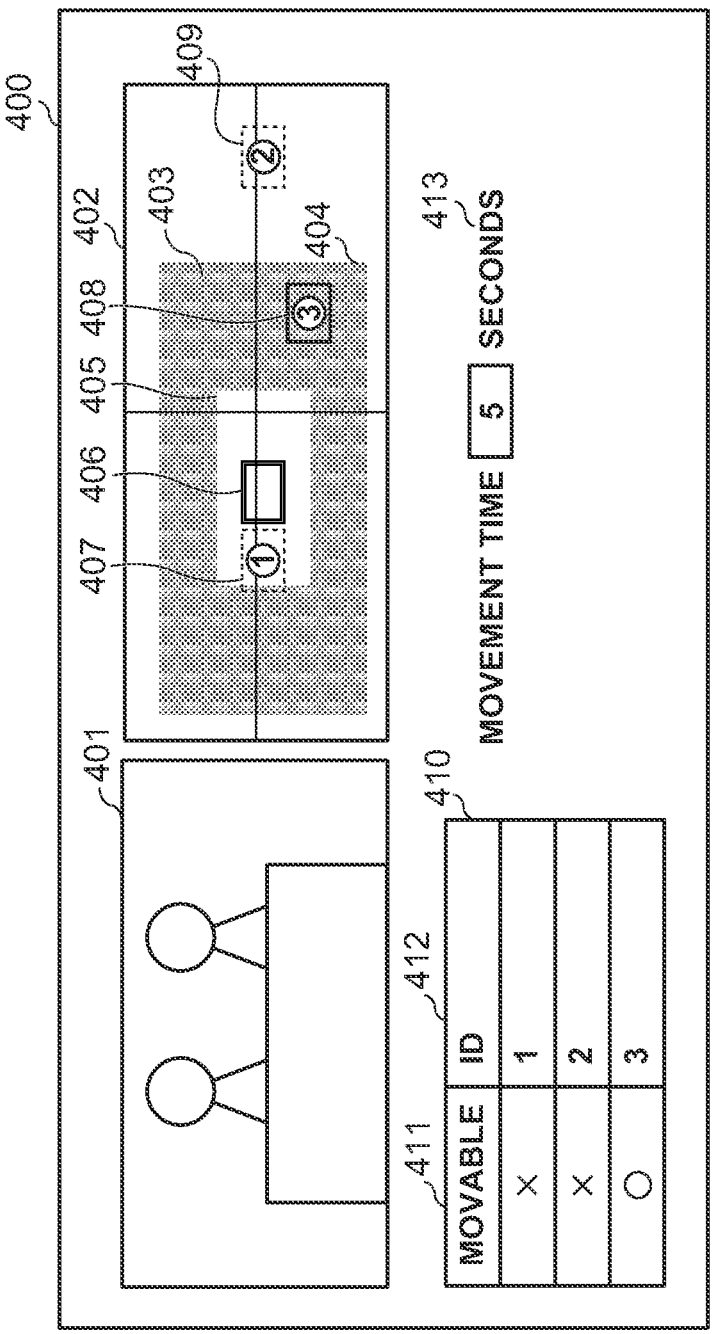
FIG. 4 illustrates an example of a graphical user interface (GUI) to be displayed on a display.

Referring now to FIG. 4, an example of the GUI that is used to make settings for the shot function and is displayed on the display 210 by the display control unit 201 according to the present exemplary embodiment will be described. A GUI 400 illustrated in FIG. 4 is configured to present information about a movable range where the image capturing range can be reached in a designated movement time and to make settings for the shot function.

As illustrated in FIG. 4, the GUI 400 displayed on the display 210 by the display control unit 201 includes a window 401 (second window) for displaying images based on image data transmitted from the image capturing apparatus 100. Examples of images based on image data include images obtained by decoding image data when the image data is generated by performing coding processing on images captured by the image capturing apparatus 100 and the generated image data is transmitted to the information processing apparatus 200. In this case, for example, the system control unit 203 may execute processing to decode the image data to acquire images based on the image data. The images to be displayed on the window 401 may include a still image captured by the image capturing apparatus 100, and a moving image including a series of captured images. The present exemplary embodiment assumes a case where a moving image captured by the image capturing apparatus 100 is delivered in real time to the information processing apparatus 200 and the moving image is displayed in real time on the window 401.

A predetermined image corresponding to a range (hereinafter referred to as a drive limit range) that can be reached when the pan, tilt, and zoom of the image capturing apparatus 100 are controlled to be driven to the drive limit is displayed on a window 402 (first window) on the GUI 400. As the predetermined image, for example, an image depicted in a predetermined color representing a range where the image capturing range can be driven, or a panorama image including a plurality of images captured while gradually changing the pan and tilt by a predetermined amount may be used. Assume that a known technique is used to generate a panorama image. A frame 406 indicating the current image capturing range of the image capturing apparatus 100 in the drive limit range is displayed on the window 402. In other words, the frame 406 corresponds to the position and size of the current image capturing range in the drive limit range. In this case, an image obtained by image capturing in the image capturing range of the frame 406 is displayed on the window 401. Information indicating the movable range calculated based on a movement time designated by the user in an entry field 413 and a movable speed to be variable when the image capturing range of the image capturing apparatus 100 is to be changed is displayed on the window 402. In other words, the movable range indicates a range where the image capturing range can be reached from the current image capturing range as a starting point in the designated movement time. In an example illustrated in FIG. 4, the display control unit 201 displays the predetermined image (e.g., a panorama image) corresponding to the drive limit range such that a graphic 403 representing the movable range is superimposed on the predetermined image as information indicating the movable range. In the example illustrated in FIG. 4, the graphic 403 is colored in gray, but instead may be colored in another predetermined color, or may be translucent. Assume that any position on a boundary 404 that is located outside the graphic 403 corresponding to the movable range is the centroid position of the image capturing range that can be reached when the image capturing range is changed in any predetermined direction at a maximum speed from the current image capturing range in the designated movement time. Also, assume that any position on a boundary 405 that is located inside the graphic 403 corresponding to the movable range is the centroid position of the image capturing range that can be reached when the image capturing range is changed in any predetermined direction at a minimum speed from the current image capturing range in the designated movement time. That is, the example illustrated in FIG. 4 indicates that the target image capturing range can be reached from the current image capturing range in the designated movement time, as long as the centroid position of the target image capturing range is included in the doughnut-shaped graphic 403 corresponding to the movable range. In other words, if the centroid position of the target image capturing range is included in the graphic 403, the target image capturing range can be reached from the current image capturing range in the designated movement time. The movable range to be calculated is not limited to the range of the centroid position of the image capturing range that can be reached from the current image capturing range in the designated movement time, but instead may be, for example, a range including the entire image capturing range that can be reached from the current image capturing range in the designated movement time. If the movement time is changed in the state where the graphic 403 corresponding to the movable range is displayed, the movable range is dynamically changed and the size of the graphic 403 corresponding to the movable range is also changed along with changing the movable range.

Processing to calculate the movable range will now be described. The system control unit 203 according to the present exemplary embodiment calculates the movable range based on the movable speed to be variable when the image capturing range is to be changed and the movement time designated by the user. The movable speed includes a pan speed range set as a speed range to control the image capturing direction in the pan direction 105 of the pan drive unit 103, and a tilt speed range set as a speed range to control the image capturing direction in the tilt direction 106 of the tilt drive unit 104. The movable range calculation processing will be described below.

First, the system control unit 203 calculates the movable range in the pan direction 105 in the movement time from the current image capturing range based on the pan speed range set as the speed range to control the image capturing direction in the pan direction 105 of the pan drive unit 103 and the movement time designated by the user. The movable range in the pan direction 105 is referred to as a pan movable range. Assume that information about the pan speed range determined based on an upper limit and a lower limit of the speed when the image capturing apparatus 100 controls the image capturing direction in the pan direction 105 is preliminarily held in the system control unit 203. However, the information may be transmitted from the image capturing apparatus 100. The present exemplary embodiment assumes a case where the lower limit of the pan speed range is 1 [degree/second], the upper limit of the pan speed range is 20 [degrees/second], and the movement time designated by the user is 5 [seconds]. In this case, the system control unit 203 calculates the absolute value of the lower limit of the pan movable range, that is, 5 [degrees], by multiplying the movement time by the lower limit of the pan speed range. Similarly, the system control unit 203 derives the absolute value of the upper limit of the pan movable range, that is, 100 [degrees], by multiplying the movement time by the upper limit of the pan speed range. For example, $-100<\alpha<-5$ and $5<\alpha<100$ are calculated as a pan movable range $\alpha$, assuming that the pan value at the centroid position of the current image capturing range is set as an origin. Assume that a positive sign is added in one of displacement directions with respect to the origin and a negative sign is added in the other displacement direction.

Further, the system control unit 203 executes the following processing. That is, the system control unit 203 calculates the movable range (tilt movable range) that can be reached in the tilt direction 106 in the movement time from the current image capturing range based on the tilt speed range set as the speed range to control the image capturing direction in the tilt direction 106 of the tilt drive unit 104 and the movement time designated by the user. Assume that information about the tilt speed range determined based on the upper limit and the lower limit of the speed when the image capturing apparatus 100 controls the image capturing direction in the tilt direction 106 is preliminarily held in the system control unit 203. However, the information may be transmitted from the image capturing apparatus 100. The present exemplary embodiment assumes a case where the lower limit of the tilt speed range is 1 [degree/second], the upper limit of the tilt speed range is 10 [degrees/second], and the movement time designated by the user is 5 [seconds]. In this case, the system control unit 203 calculates the absolute value of the lower limit of the tilt movable range, that is, 5 [degrees], by multiplying the movement time by the lower limit of the tilt speed range. Similarly, the system control unit 203 derives the absolute value of the upper limit of the tilt movable range, that is, 50 [degrees], by multiplying the movement time by the upper limit of the tilt speed range. For example, $-50<\beta<-5$ and $5<\beta<50$ are calculated as a tilt movable range $\beta$, assuming that the tilt value at the centroid position of the current image capturing range is set as an origin. Assume that a positive sign is added in one of displacement directions with respect to the origin and a negative sign is added in the other displacement direction.

The system control unit 203 calculates the movable range using the calculated pan movable range $\alpha$ and tilt movable range $\beta$. Specifically, a rectangular range including the pan movable range $\alpha$ in the horizontal direction (pan direction 105) and the tilt movable range $\beta$ in the vertical direction (tilt direction 106) from 0 [degrees] corresponding to the origin of the current image capturing range is calculated as the movable range. In the example illustrated in FIG. 4, the range in the horizontal direction on the graphic 403 corresponding to the movable range corresponds to the pan movable range $\alpha$, and the range in the vertical direction on the graphic 403 corresponds to the tilt movable range $\beta$. In the present exemplary embodiment, assume that a zoom speed range set as a speed range to change the zoom value is larger than the pan speed range and the tilt speed range. In other words, a zoom movable range falls within the pan movable range and the tilt movable range. Accordingly, in the example illustrated in FIG. 4, if the centroid position of the target image capturing range is included in the graphic 403 corresponding to the movable range, the target image capturing range can be reached in the designated movement time from the current image capturing range, regardless of the zoom value in the target image capturing range. The movable range may be calculated also in consideration of the zoom speed range.

As illustrated in FIG. 4, frames indicating the position and size of one or more target image capturing ranges preliminarily set by the user are superimposed on the window 402. In the example illustrated in FIG. 4, frames 407 to 409 indicating the positions and sizes of three target image capturing ranges, respectively, are superimposed on the predetermined image (panorama image). In this case, the display control unit 201 may change a display mode for the frames 407 to 409 corresponding to the three respective target image capturing ranges, depending on whether the target image capturing range can be reached from the current image capturing range in the designated movement time (in other words, depending on whether the frames are included in the movable range). Specifically, the display control unit 201 causes the frame 408 included in the graphic 403 corresponding to the movable range to be displayed in a first display mode. In this case, the frame 407 is included in the graphic 403, which indicates that the target image capturing range corresponding to the frame 407 can be reached in the designated movement time from the current image capturing range. In this case, since the frame 407 and the frame 409 are not included in the graphic 403 corresponding to the movable range, the display control unit 201 indicates that the target image capturing range corresponding to each of the frame 407 and the frame 409 cannot be reached in the designated movement time from the current image capturing range. Thus, the display control unit 201 causes the frame 407 and the frame 409 to be displayed in a second display mode different from the first display mode. The display control unit 201 may change the display mode depending on whether one of the pan and tilt cannot reach the target image capturing range in the movement time on the frame 407 and the frame 409 corresponding to the target image capturing range that cannot be reached in the currently designated movement time. For example, the display mode for the frames may be changed such that the display mode when the pan movable range cannot be reached in the movement time is different from the display mode when the tilt movable range cannot be reached in the movement time.

If the centroid position of the target image capturing range is included in the movable range (if the centroid position of a frame in the target image capturing range is included in the graphic 403), the system control unit 203 according to the present exemplary embodiment determines that the frame in the target image capturing range is included in the graphic 403 and the target image capturing range can be reached. On the other hand, if the centroid position of the target image capturing range is not included in the movable range (if the centroid position of a frame in the target image capturing is not included in the graphic 403), the system control unit 203 determines that the frame in the target image capturing range is not included in the graphic 403 and the target image capturing range cannot be reached.

As illustrated in FIG. 4, the display control unit 201 causes list information 410 to be displayed on the GUI 400. The list information 410 includes movable information 411 and an identification (ID) 412 for each of the one or more target image capturing ranges set by the user. The movable information 411 indicates whether the target image capturing range can be reached in the currently designated movement time. The ID 412 is used to identify the target image capturing range. The movable information 411 in the list information 410 illustrated in FIG. 4 indicates that the target image capturing range of the frame 407 with the ID 412 of "1" and the target image capturing range of the frame 409 with the ID 412 of "2" are unmovable. The movable information 411 also indicates that the target image capturing range of the frame 408 with the ID 412 of "3" is movable.

Figure 5:
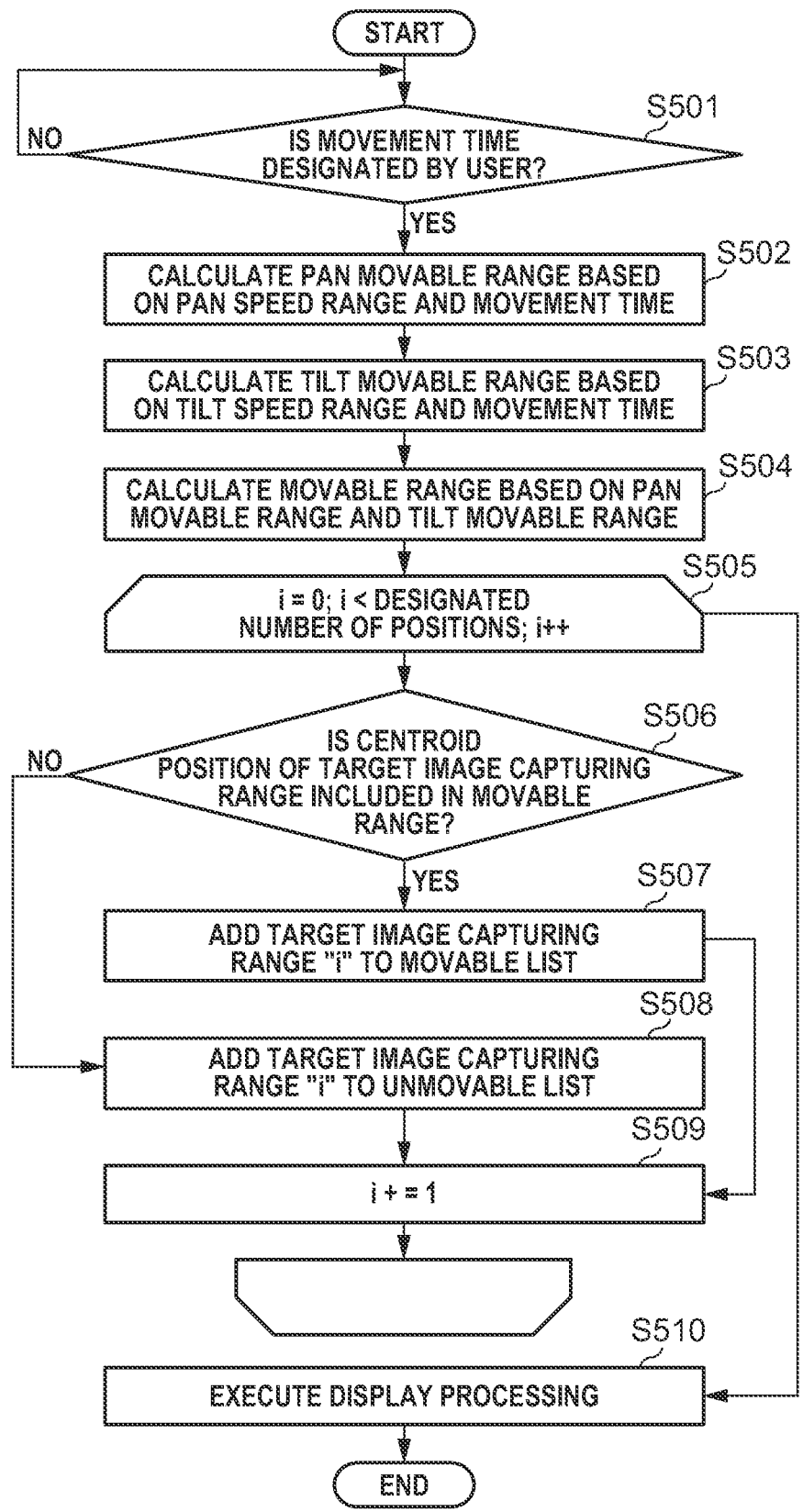
FIG. 5 is a flowchart illustrating a processing flow of displaying information about a movable range.

Referring next to a flowchart illustrated in FIG. 5, processing to display information about the movable range according to the present exemplary embodiment will be described. The processing illustrated in the flowchart of FIG. 5 is executed by the functional blocks of the information processing apparatus 200 illustrated in FIG. 4 that are implemented such that, for example, computer programs stored in the ROM 920 of the information processing apparatus 200 are executed by the CPU 900 of the information processing apparatus 200.

First, in step S501, the system control unit 203 determines whether the movement time is designated by the user in the entry field 413. If it is determined that the movement time is designated (YES in step S501), the processing proceeds to step S502. If it is determined that the movement time is not designated (NO in step S501), the determination processing of step S501 is repeated.

Next, in step S502, the system control unit 203 calculates the pan movable range based on the pan speed range and the designated movement time. In this case, assume that the lower limit of the pan speed range is 1 [degree/second], the upper limit of the pan speed range is 20 [degrees/second], and the movement time designated by the user is 5 [seconds]. In this case, the system control unit 203 calculates the absolute value of the lower limit of the pan movable range, that is, 5 [degrees], by multiplying the movement time by the lower limit of the pan speed range. Similarly, the system control unit 203 derives the absolute value of the upper limit of the pan movable range, that is, 100 [degrees], by multiplying the movement time by the upper limit of the pan speed range. For example, $-100<\alpha<-5$ and $5<\alpha<100$ are calculated as the pan movable range $\alpha$, assuming that the pan value at the centroid position of the current image capturing range is set as an origin.

Next, in step S503, the system control unit 203 calculates the tilt movable range based on the tilt speed range and the designated movement time. In this case, assume that the lower limit of the tilt speed range is 1 [degree/second], the upper limit of the tilt speed range is 10 [degrees/second], and the movement time designated by the user is 5 [seconds]. In this case, the system control unit 203 calculates the absolute value of the lower limit of the tilt movable range, that is, 5 [degrees], by multiplying the movement time by the lower limit of the tilt speed range. Similarly, the system control unit 203 derives the absolute value of the upper limit of the tilt movable range, that is, 50 [degrees], by multiplying the movement time by the upper limit of the tilt speed range. For example, $-50<\alpha<-5$ and $5<\alpha<50$ are calculated as the tilt movable range $\alpha$, assuming that the tilt value at the centroid position of the current image capturing range is set as an origin.

Next, in step S504, the system control unit 203 calculates the movable range based on the calculated pan movable range and tilt movable range.

Next, processing of steps S505 to S509 is executed a number of times corresponding to the number of target image capturing ranges preliminarily designated by the user after a target image capturing range "i" is reset (i=0). First, in step S506, the system control unit 203 determines whether the centroid position of the target image capturing range "i" is included in the movable range. If it is determined that the centroid position of the target image capturing range "i" is included in the movable range (YES in step S506), the processing proceeds to step S507. In step S507, the system control unit 203 adds the target image capturing range "i" to a movable list. If it is determined that the centroid position of the target image capturing range "i" is not included in the movable range (NO in step S506), the processing proceeds to step S508. In step S508, the system control unit 203 adds the target image capturing range "i" to an unmovable list. In step S509, the system control unit 203 increments the value of the target image capturing range "i", and then the processing returns to step S505. After the processing on all the target image capturing ranges is completed, the processing proceeds to step S510. In step S510, the display control unit 201 causes the display 210 to display the GUI 400 illustrated in FIG. 4, including the calculated movable range and the frame corresponding to the designated target image capturing range.

As described above, the information processing apparatus 200 according to the present exemplary embodiment calculates the movable range from the current image capturing range based on the movable speed to be variable when the image capturing range is to be changed and the movable time designated by the user. Further, the information processing apparatus 200 causes the display 210 to display information about the movable range. The above-described configuration enables the user to recognize the image capturing range where the target image capturing range can be actually reached in the designated movement time.

In the example illustrated in FIG. 4, the graphic 403 corresponding to the movable range calculated in consideration of the lower limit of the pan speed range and the lower limit of the tilt speed range is displayed. For example, assume a case where the pan speed range is 1 to 20 [degrees/second] and the movement time is 5 [seconds]. In this case, 5 [degrees] is obtained as the absolute value of the lower limit of the pan movable range by multiplying the lower limit of the pan speed range, that is, 1 [degree/second], by the movement time of 5 [seconds]. In the example illustrated in FIG. 4, the centroid position of the current image capturing range is set as 0 [degrees] and a range from 5 [degrees] leftward to 5 [degrees] rightward in the horizontal direction is treated as the unmovable range in the designated movement time of 5 [seconds]. However, the present exemplary embodiment is not limited to this case. Specifically, even in a case where the lower limit of the pan speed range is 1 [degree/second] and the movement time is 5 [seconds], if the pan is intermittently controlled, the target image capturing range within the range from 5 [degrees] leftward to 5 [degrees] rightward in the horizontal direction can be reached from the current image capturing range in the movement time.

Figure 6:
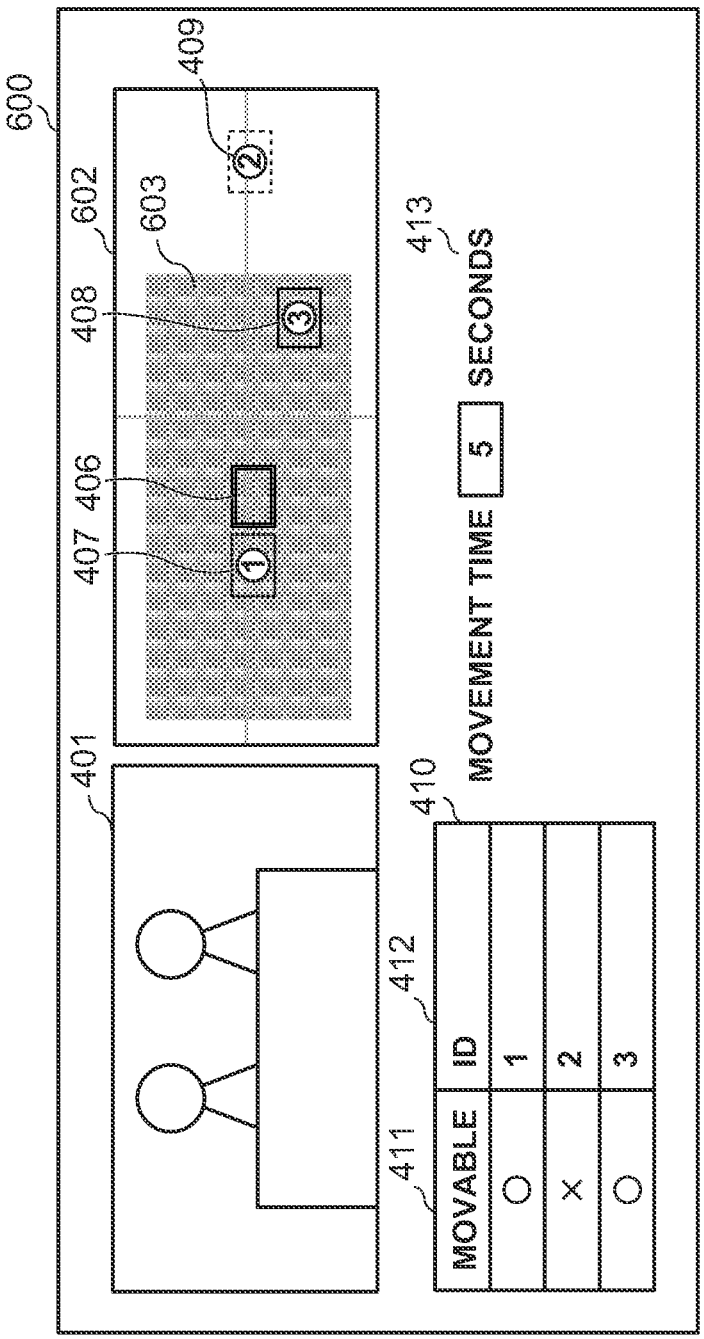
FIG. 6 illustrates an example of the GUI to be displayed on the display.

Accordingly, the present exemplary embodiment is not limited to the example illustrated in FIG. 4, and the system control unit 203 according to the present exemplary embodiment may calculate the movable range based on the upper limit of the pan speed range, the upper limit of the tilt speed range, and the designated movement time, without considering the lower limit of the pan speed range and the lower limit of the tilt speed range. A graphic 603 corresponding to the movable range calculated as described above is superimposed on a window 602 (first window) of a GUI 600 illustrated in FIG. 6.

In a second exemplary embodiment, a display mode for the movable range is changed in consideration of a speed (pan speed) to be variable when the image capturing direction is to be changed in the pan direction 105 of the pan drive unit 103 and a speed (tilt speed) to be variable when the image capturing direction is to be changed in the tilt direction 106 of the tilt drive unit 104. In the second exemplary embodiment, components different from those of the first exemplary embodiment will be mainly described. Components and processing that are identical or similar to those of the first exemplary embodiment are denoted by the same reference symbols, and redundant descriptions are omitted.

Figure 7:
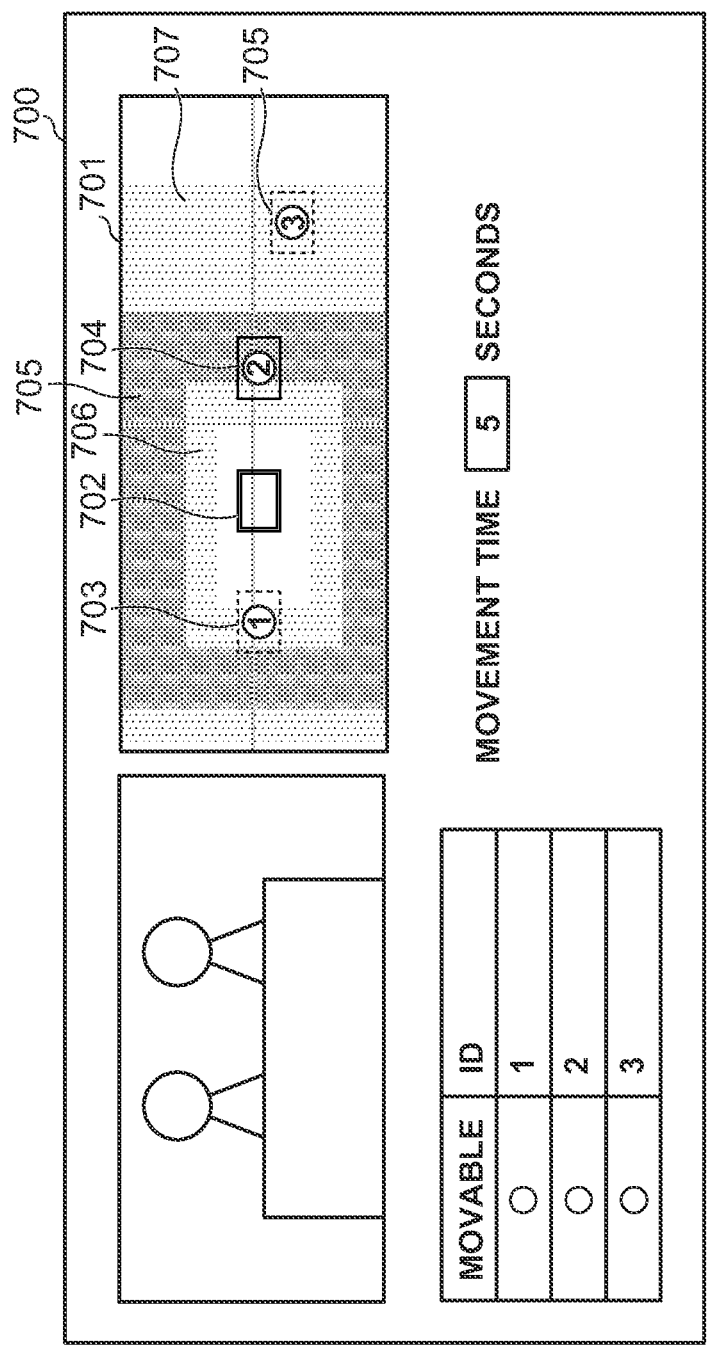
FIG. 7 illustrates another example of the GUI to be displayed on the display.

A GUI 700 illustrated in FIG. 7 is displayed on the display 210 by the display control unit 201, and the predetermined image (e.g., a panorama image) corresponding to the drive limit range is displayed on a window 701 (first window). A frame 702 corresponding to the current image capturing range and frames 703 to 705 corresponding to a plurality of respective target image capturing ranges are displayed in a superimposed manner on the window 701.

In this case, an image capturing range change speed upon execution of the shot function varies depending on the designated time, the current image capturing range, and the designated target image capturing range. For example, in a certain designated time, the change speed from the current image capturing range to a farther target image capturing range is higher than the change speed from the current image capturing range to a closer target image capturing range. A much higher image capturing range change speed upon execution of the shot function causes blur of an object in a captured video image, which may lead to deterioration in the quality of the video image. For this reason, in the present exemplary embodiment, the display mode for the graphic representing the movable range to be displayed on the window 701 is changed depending on the change speed upon execution of the shot function, assuming that the current image capturing range in the currently designated time is set as a starting point. In an example illustrated in FIG. 7, the change speed upon execution of the shot function increases as the distance from the frame 702 increases even when the frame 702 is located within the movable range that can be reached in the currently designated movement time of 5 [seconds], assuming that the frame 702 corresponding to the current image capturing range is set as a starting point. In this case, a first threshold and a second threshold that is greater than the first threshold are set in advance. The display mode for the movable range is changed such that the display mode for a range (low-speed range 706) where the change speed upon execution of the shot function is less than the first threshold, the display mode for a range (appropriate speed range 705) where the change speed is more than or equal to the first threshold and less than the second threshold, and the display mode for a range (high-speed range 707) where the change speed is more than or equal to the second threshold are different from each other.

With this configuration, it is possible to present not only information about a range that can be reached in a designated time, but also information about an appropriate range in terms of the quality of a captured video image to the user.

In the first exemplary embodiment, the information processing apparatus 200 executes calculation of the movable range and processing to determine whether the target image capturing range is included in the movable range. In a third exemplary embodiment, the image capturing apparatus 100 executes the processing. In the third exemplary embodiment, components different from those of the first exemplary embodiment will be mainly described. Components and processing that are identical or similar to those of the first exemplary embodiment are denoted by the same reference symbols, and redundant descriptions are omitted.

Figure 8:
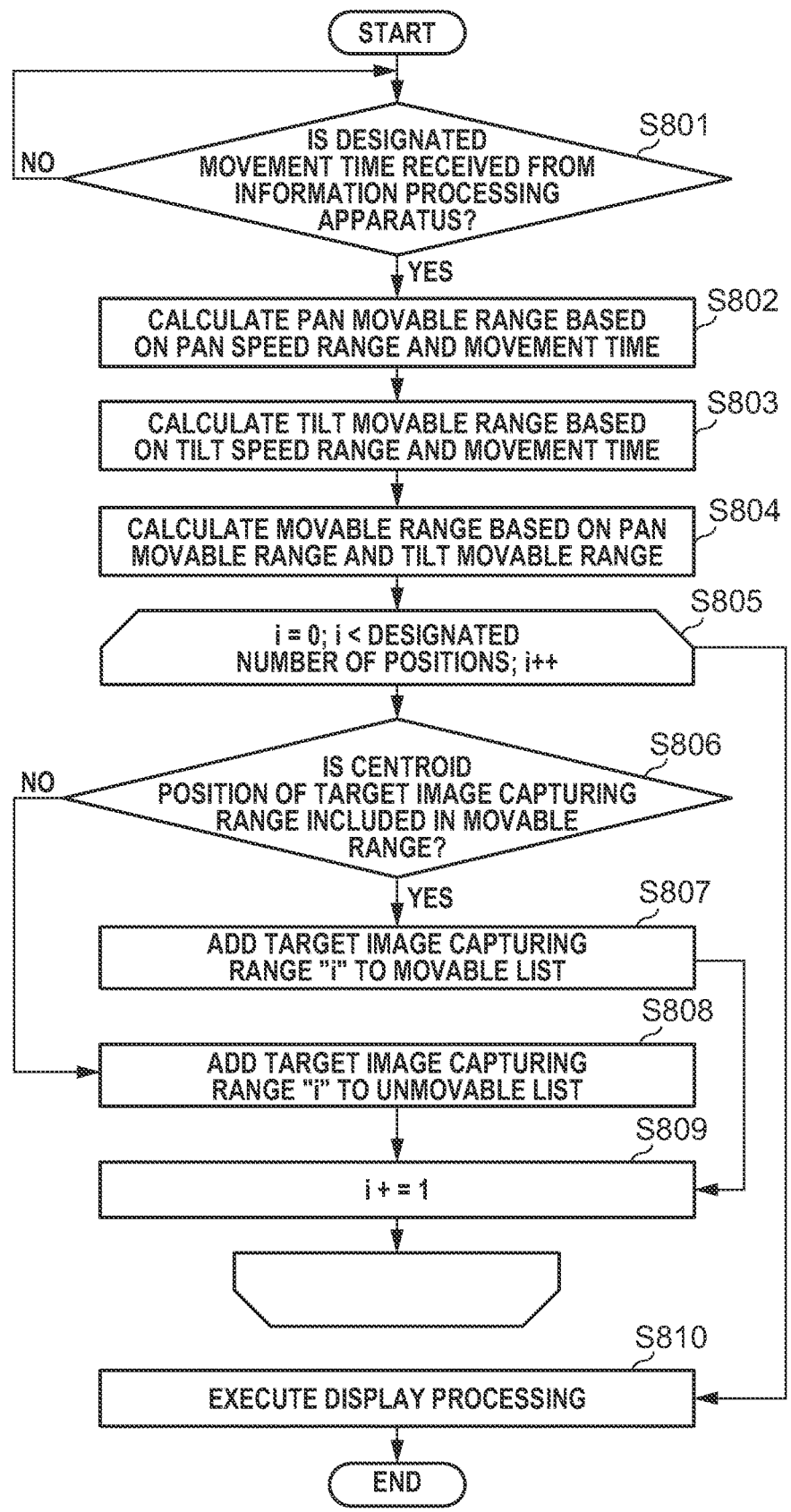
FIG. 8 is a flowchart illustrating a processing flow of displaying information about the movable range.

Referring now to a flowchart illustrated in FIG. 8, processing to display information about the movable range according to the present exemplary embodiment will be described. The processing illustrated in the flowchart of FIG. 8 is executed by the functional blocks of the information processing apparatus 200 illustrated in FIG. 3 that are implemented such that, for example, computer programs stored in the ROM 920 of the image capturing apparatus 100 are executed by the CPU 900 of the information processing apparatus 200.

First, in step S801, the system control unit 113 of the image capturing apparatus 100 acquires information about the movement time designated by the user in the information processing apparatus 200 from the information processing apparatus 200.

Next, in step S802, the system control unit 113 calculates the pan movable range based on the pan speed range and the designated movement time. Next, in step S803, the system control unit 113 calculates the tilt movable range based on the tilt speed range and the designated movement time. Next, in step S804, the system control unit 113 calculates the movable range based on the calculated pan movable range and tilt movable range. Then, processing of steps S805 to S809 is executed a number of times corresponding to the number of target image capturing ranges preliminarily designated by the user after the target image capturing range "i" is reset (i=0). First, in step S806, the system control unit 113 determines whether the centroid position of the target image capturing range "i" is included in the movable range. If it is determined that the centroid position of the target image capturing range "i" is included in the movable range (YES in step S806), the processing proceeds to step S807. In step S807, the system control unit 113 adds the target image capturing range "i" to the movable list. If it is determined that the centroid position of the target image capturing range "i" is not included in the movable range (NO in step S806), the processing proceeds to step S808. In step S808, the system control unit 113 adds the target image capturing range "i" to the unmovable list. In step S809, the system control unit 113 increments the value of the target image capturing range "i", and then the processing returns to step S805. After the processing on all the target image capturing ranges is completed, the processing proceeds to step S810. In step S810, the system control unit 113 generates the GUI 400 illustrated in FIG. 4. The GUI 400 includes the calculated movable range and the frame corresponding to the designated target image capturing range. Then, the system control unit 113 causes the display 210 to display the generated GUI 400 via the information processing apparatus 200 by transmitting information about the generated GUI 400 to the information processing apparatus 200.

As described above, the image capturing apparatus 100 according to the present exemplary embodiment calculates the movable range that can be reached from the current image capturing range based on the movable speed to be variable when the image capturing range is to be changed and the movement time designated by the user. Further, the image capturing apparatus 100 causes the display 210 to display information about the movable range. The above-described configuration enables the user to recognize the image capturing range that can be actually reached in the designated movement time.

Other Embodiments

Figure 9:
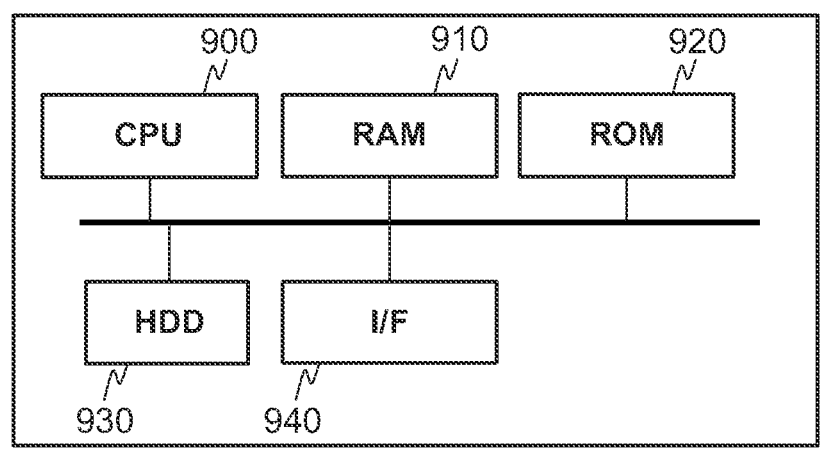
FIG. 9 is a block diagram illustrating a hardware configuration example of each device.

Referring next to FIG. 9, a hardware configuration example of the information processing apparatus 200 to implement the functions according to the above-described exemplary embodiments will be described. While a hardware configuration example of the information processing apparatus 200 is described below, the image capturing apparatus 100 can also be implemented using a hardware configuration similar to that of the information processing apparatus 200.

The information processing apparatus 200 according to the present exemplary embodiment includes the CPU 900, a random access memory (RAM) 910, the ROM 920, a hard disk drive (HDD) 930, and the I/F 940.

The CPU 900 is a central processing unit that controls the information processing apparatus 200 in an integrated manner. The RAM 910 temporarily stores computer programs to be executed by the CPU 900. The RAM 910 provides a work area used for the CPU 900 to execute processing. For example, the RAM 910 functions as a frame memory or a buffer memory.

The ROM 920 stores programs and the like for the CPU 900 to control the information processing apparatus 200. The HDD 930 is a storage device that records image data and the like.

The I/F 940 communicates with an external apparatus via the network 300 in accordance with a Transmission Control Protocol/Internet Protocol (TPC/IP), a HyperText Transfer Protocol (HTTP), or the like.

While the above-described exemplary embodiments illustrate an example where the CPU 900 executes processing, at least a part of the processing of the CPU 900 may be performed by dedicated hardware. For example, processing to display a GUI and image data on the display 210 may be executed by a graphics processing unit (GPU). Processing to read out a program code from the ROM 920 and load the program code into the RAM 910 may be executed by a direct memory access (DMA) that functions as a transfer device.

The present invention can also be implemented by processing to be executed such that one or more processors read out a program for implementing one or more functions according to the exemplary embodiments described above and execute the program. The program may be supplied to a system or an apparatus including the processors via a network or a storage medium.

The present invention can also be implemented by a circuit (e.g., an application-specific integrated circuit (ASIC)) for implementing one or more functions according to the exemplary embodiments described above. Each unit of the information processing apparatus 200 may be implemented by hardware modules illustrated in FIG. 9 or by software modules. One or more functions of the information processing apparatus 200 according to the exemplary embodiments described above may be included in another apparatus.

While the present invention has been described together with exemplary embodiments, the above-described exemplary embodiments merely illustrate specific examples in implementing the present invention, and the technical scope of the present invention should not be interpreted in a limited manner based on these exemplary embodiments. That is, the present invention can be implemented in various ways without departing from the technical ideas or the main features of the present invention. For example, combinations of the exemplary embodiments are also included in the disclosed contents of the specification.

According to the above-described exemplary embodiments, it is possible to enable a user to recognize an image capturing range that can be actually reached in a designated movement time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-169109, filed Oct. 14, 2021, which is hereby incorporated by reference herein in its entirety.

What is claimed is:

1. An information processing apparatus causing a display device to display information about an image capturing apparatus configured to control at least one of pan and tilt to change an image capturing range, the information processing apparatus comprising a computer executing instructions which, when executed by the computer, cause the information processing apparatus to:
   acquire information about a movement time to control the image capturing range from a current image capturing range of the image capturing apparatus based on a user operation; and
   cause the display device to display a first window including information indicating a movable range where the image capturing range is reachable in the movement time, the movable range being calculated based on the movement time, a first driving speed, and a second driving speed,
   wherein each of the first driving speed and the second driving speed is a value related to a driving speed which has been preliminarily set to the image capturing apparatus.

2. The information processing apparatus according to claim 1, wherein the instructions cause the information processing apparatus to calculate the movable range based on the movement time, the first driving speed, and the second driving speed.

3. The information processing apparatus according to claim 2,
   wherein the first driving speed is a maximum speed at which the image capturing apparatus can control the pan or tilt.

4. The information processing apparatus according to claim 3, wherein the second driving speed is a minimum speed at which the image capturing apparatus can perform the pan or tilt.

5. The information processing apparatus according to claim 1, wherein in a state where the information indicating the movable range is displayed on the first window, the information indicating the movable range displayed on the first window is changed along with changing of the movement time by a user.

6. The information processing apparatus according to claim 1, wherein the instructions cause the information processing apparatus to display frames corresponding to one or more target image capturing ranges on the first window, the one or more target image capturing ranges being set by a user as a target image capturing range to be reached from the current image capturing range.

7. The information processing apparatus according to claim 6, wherein the instructions cause the information processing apparatus to change a display mode for the frames corresponding to the one or more target image capturing ranges so that the display mode for a frame included in the movable range is different from the display mode for a frame not included in the movable range.

8. The information processing apparatus according to claim 6, wherein the instructions cause the information processing apparatus to cause the display device to display, for each of the one or more target image capturing ranges, list information including identification information to identify the target image capturing range and information indicating whether a frame is included in the movable range.

9. The information processing apparatus according to claim 1, wherein the instructions cause the information processing apparatus to cause the display device to display the first window and a second window on which an image captured by the image capturing apparatus is displayed, the first window and the second window being displayed side by side.

10. The information processing apparatus according to claim 1, wherein the instructions cause the information processing apparatus to cause the display device to display a frame corresponding to the current image capturing range on the first window.

11. An information processing method that causes a display device to display information about an image capturing apparatus configured to control at least one of pan and tilt to change an image capturing range, the information processing method comprising:
    acquiring information about a movement time from a current image capturing range of the image capturing apparatus to a target image capturing range as a destination image capturing range based on a user operation; and
    performing display control to cause the display device to display a first window including information indicating a movable range where the image capturing range is reachable in the movement time, the movable range being calculated based on the movement time, a first driving speed, and a second driving speed,
    wherein each of the first driving speed and the second driving speed is a value related to a driving speed which has been preliminarily set to the image capturing apparatus.

12. A non-transitory computer readable storage medium storing a program for causing a computer to perform an information processing method that causes a display device to display information about an image capturing apparatus configured to control at least one of pan and tilt to change an image capturing range, the information processing method comprising:
    acquiring information about a movement time from a current image capturing range of the image capturing apparatus to a target image capturing range as a destination image capturing range based on a user operation; and
    performing display control to cause the display device to display a first window including information indicating a movable range where the image capturing range is reachable in the movement time, the movable range being calculated based on the movement time, a first driving speed, and a second driving speed,
    wherein each of the first driving speed and the second driving speed is a value related to a driving speed which has been preliminarily set to the image capturing apparatus.

* * * * *